May 3, 1938.  H. W. FORCE  2,115,925
MANUFACTURE OF WELDED SPIRAL PIPE
Filed Sept. 25, 1933   2 Sheets-Sheet 1
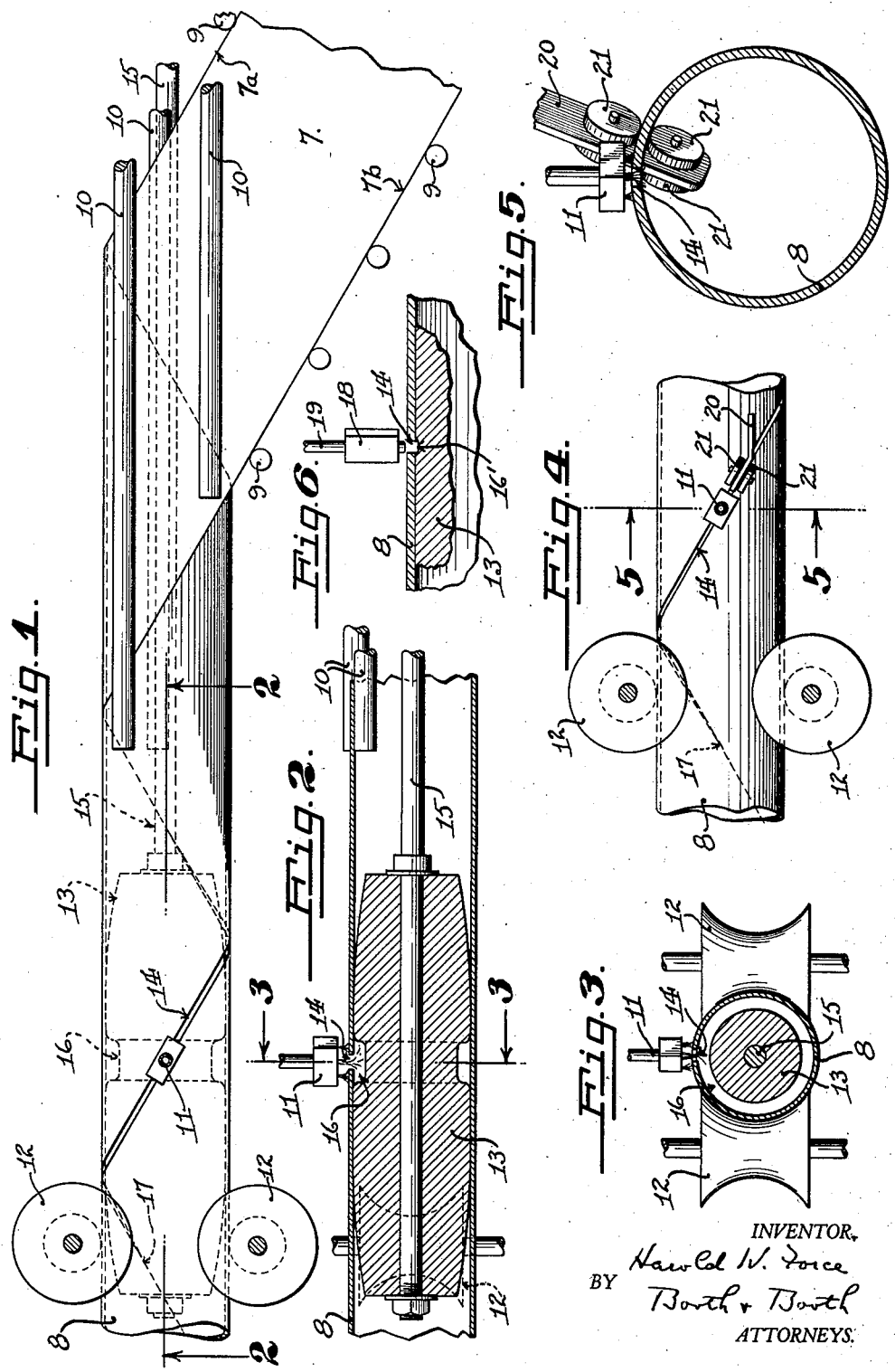

May 3, 1938. H. W. FORCE 2,115,925
MANUFACTURE OF WELDED SPIRAL PIPE
Filed Sept. 25, 1933 2 Sheets-Sheet 2
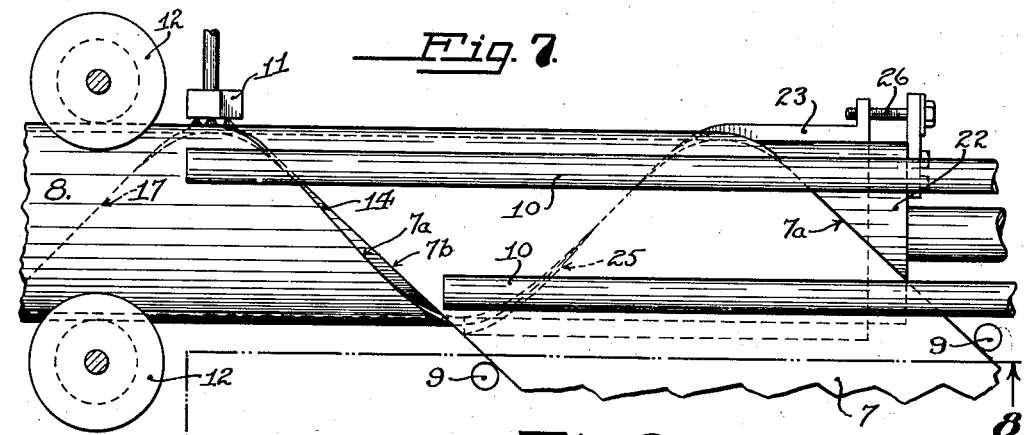
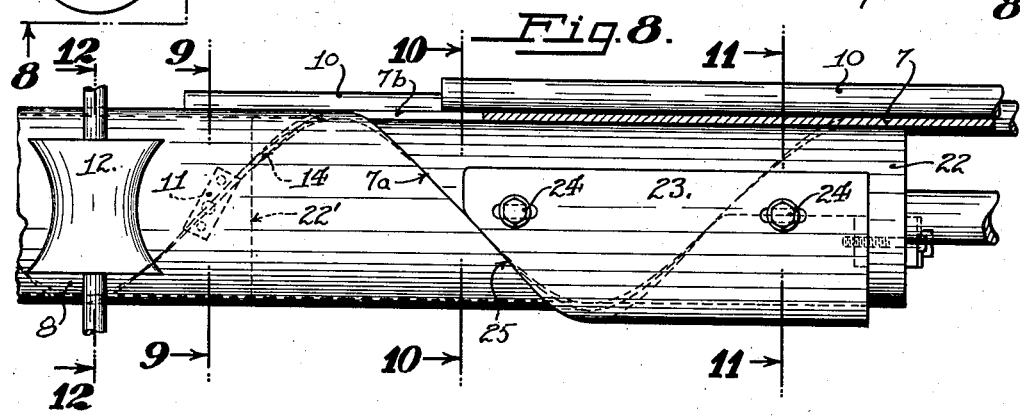
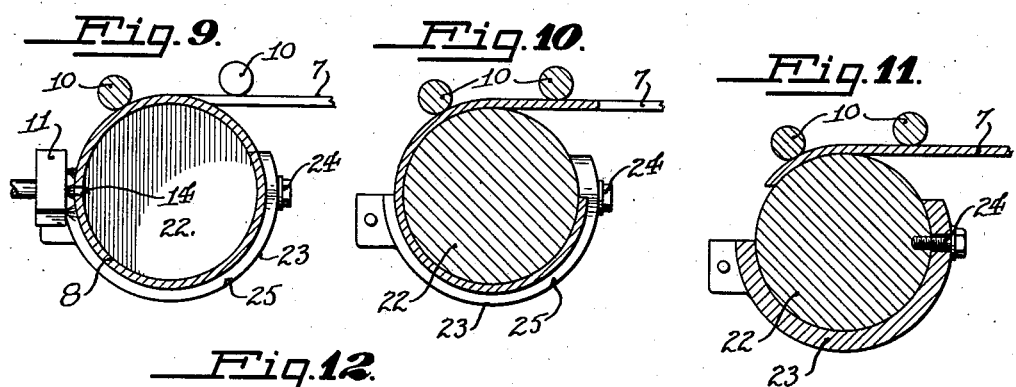
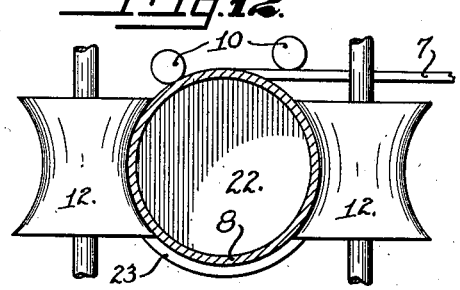
INVENTOR,
Harold W. Force
BY Booth & Booth
ATTORNEYS.

Patented May 3, 1938

2,115,925

UNITED STATES PATENT OFFICE 2,115,925

MANUFACTURE OF WELDED SPIRAL PIPE

Harold W. Force, Oakland, Calif., assignor, by mesne assignments, to The American Rolling Mill Company, Middletown, Ohio, a corporation of Ohio Application September 25, 1933, Serial No. 690,817

7 Claims. (Cl. 78—86)

This is a continuation in part of my copending application for Manufacture of welded spiral pipe, Serial Number 445,917, filed April 21st, 1930.

The principal objects of the present invention are the same as those set forth in the above mentioned application, viz:—to provide for the rapid formation of a perfect welded helical seam between the adjacent convolutions of a helically wound strip or sheet in the manufacture of so called spiral pipe, and to compensate for accidental variations in the width of the incoming sheet or for slight curvature of its edges.

These objects are attained in a manner generically similar to that described in said copending application, viz:—by winding a strip or sheet of metal helically to bring the edges of its convolutions into approximately parallel and adjacent relation; then separating said edges or maintaining a space between them and applying heat thereto from a gas torch or other suitable means, the separation of the edges causing them to be evenly heated throughout the thickness of the metal, by permitting the flame to pass between them and reach their under surfaces; and finally closing or filling the space between the heated edges to form a welded seam, which, on account of the even heating, can be made with greater speed and more perfect results than is possible under other conditions.

The present invention includes certain means for opening and maintaining the proper space between the adjacent edges of the helically wound sheet, disclosed but not claimed in my said copending application, and adds thereto a new modified form of means for the same purpose. It also includes another novel feature which consists in closing or filling the open seam by forcibly squeezing or pressing the heated edges together in abutting relation to cause them to fuse to form the welded seam, whereas in said copending application the seam is closed and welded by supplying molten metal thereto from an outside source, as for example from a metal weld rod. It is to be understood that either method of filling or closing and welding the seam may be used in carrying out the present invention, or even, if desired, both methods may be used simultaneously, and moreover, that changes, within the scope of the claims hereto appended, may be made in the form, construction and arrangement of the several parts herein shown and described, without departing from the spirit of the invention as defined in said claims.

Reference should be had to the accompanying drawings in which

Fig. 1 is a plan view, partly conventional, and partly diagrammatic, of an apparatus for making spiral pipe embodying one form of my invention.

Fig. 2 is a longitudinal section on the line 2—2 of Fig. 1.

Fig. 3 is a transverse section on the line 3—3 of Fig. 2.

Fig. 4 is a fragmentary plan illustrating another means for maintaining an open seam during the heating of the edges thereof.

Fig. 5 is a transverse section enlarged, on the line 5—5 of Fig. 4.

Fig. 6 is a fragmentary longitudinal section illustrating another means for closing the open seam and forming the weld.

Fig. 7 is a broken plan view showing another modification of the seam spreading means.

Fig. 8 is a broken side elevation of the form shown in Fig. 7, taken on the line 8—8 thereof.

Figs. 9, 10, 11 and 12 are transverse sections taken on the correspondingly numbered lines of Fig. 8.

In the drawings, the reference numeral 7 designates a sheet or strip of metal which is wound helically to form a tube or pipe 8. Any suitable guide means indicated as rollers 9 may be employed for guiding the sheet 7 at the proper angle to the bending or winding means which is illustrated conventionally as comprising parallel rollers 10, bearing against the surface of the sheet in proper positions to bend it into tubular form with its rear edge 7a adjacent its forward edge 7b. The tube thus formed slides off the bending rollers 10 endwise, impelled by the combined action of said bending rollers and the guide rollers 9, and the adjacent edges of its helical seam are heated by a suitable instrumentality indicated at 11, and subsequently welded to form a rigid pipe. The end or finished portion of the pipe is supported and guided by any suitable means, for example, a pair of concave rollers 12. It is understood that the axes of the rollers 12 may be adjustable laterally for the dual purpose of shifting the axis of the finished portion of the pipe relative to the axis of winding of the sheet, and for increasing and decreasing the space between said rollers.

The angle of feed of the incoming sheet 7 is so adjusted as to cause its edges 7a and 7b to be approximately contiguous and in abutting relation. Because of the inherent inaccuracy in the edges of metal sheets of this character, which sometimes amounts to a perceptible curvature, the relative positions of said edges when they first meet in the winding of the tube is not constant. This is not troublesome, however, because the subsequent operations are designed fully to compensate for such inaccuracy in the initial relation between the adjacent edges.

The first operation, after the winding of the sheet into tubular form, consists in spreading its adjacent edges to form an open seam of constant width. Such spreading may be accomplished in a number of ways. It may be done by shifting the guide rollers 12 to offset the axis of the finished portion of the pipe with respect to its axis of winding, as described in my copending application above referred to, or, as illustrated in Fig. 1 herein, the wound tube may be passed over a floating plug 13 whose diameter is such as to cause a slight expansion of said tube, thereby opening the seam to the desired width, as shown at 14. The end portions of the plug 13 are preferably tapered, as shown, and it is held against longitudinal movement by a rod 15, whose end is secured to any suitable portion of the frame of the machine (not shown). The plug 13 may or may not rotate upon the rod 15.

At approximately the point where the seam 14 reaches its maximum spread, its edges are heated by the welding torch 11, illustrated in Figs. 1, 2 and 3 as a gas torch. At this point the plug 13 is provided with a peripheral groove 16. The welding flame, therefore, passes between the separated edges of the sheet and is enabled to heat them evenly throughout their entire thickness.

As the wound tube passes off the plug 13, it is compressed or squeezed between the guide rollers 12, which compression slightly decreases its diameter and closes the hitherto open seam, pressing the heated edges together in abutting relation with sufficient force to cause them to fuse into a permanent weld, as indicated by the dotted line 17. An alternative means for forming the weld is illustrated in Fig. 6 in which an electric welder is indicated at 18 instead of the gas torch of Fig. 1. A metal electrode or weld rod 19 is provided from which extra metal is supplied to fill the open seam 14, and to form the weld by fusing with the edges of the sheet. In this modification the interior plug 13 is provided with only a small shallow groove 16' so that it may provide a backing to prevent the molten metal from falling through to the inside of the pipe.

In Figs. 4 and 5 I have shown an alternative means for maintaining the open seam 14. The interior plug 13 of Fig. 1 is dispensed with and a flat guide fin 20 is attached to any convenient portion of the frame of the machine, not shown, in a position to cause it to extend between the adjacent edges of the wound sheet, thereby maintaining the desired space between them. Rollers 21 are carried by the guide fin 20 and bear against the inner and outer surfaces of the edge portions of the wound sheet to maintain said edge portions in horizontal alignment. The welding means, which may be either the gas torch 11 and compression rollers 12 of Fig. 1 or the electric welder 18 of Fig. 6, operates upon the open seam 14 immediately behind the guide fin 20.

Another alternative means for spreading and maintaining the open seam during the heating of its edges is illustrated in Figs. 7 to 12 inclusive, in which the sheet 7 is wound by the bending rollers 10 about a stationary mandrel 22. Slidably mounted upon said mandrel is a partial sleeve 23, positioned beneath the incoming portion of the sheet, and secured to the mandrel by slot and bolt connections 24 for longitudinal but not rotary movement. The forward (left hand) end 25 of the partial sleeve 23 is formed upon a helical line corresponding to the helical seam of the pipe, and bears against the rear edge 7a of the sheet for a portion of its travel before it meets the forward edge 7b.

Suitable means, indicated as an adjusting screw 26, are provided for shifting the partial sleeve 23 along the mandrel, so that, by moving said sleeve forwardly (toward the left), its end 25 forces the edge 7a of the sheet away from the rear edge 7b, thereby producing and maintaining the open seam 14, as shown in Figs. 7, 8 and 9. The heating torch 11 is positioned just beyond the end 22' of the mandrel, so that its flame penetrates freely to the inside of the pipe to heat the spaced edges evenly. The compression rollers 12, as in the previously described forms, follow closely to squeeze the heated edges together to form the weld 17.

It will be readily appreciated by those skilled in the art that either means described and shown herein for closing the previously opened seam and forming the weld, i. e. either the compression rollers 12 or the weld rod 19 (of Fig. 6) may be used with any of the means for initially opening the seam, i. e. the enlarged plug 13 of Fig. 1, the guide fin 20 of Figs. 4 and 5, or the partial sleeve 23 of Fig. 8.

I claim:

1. An apparatus for making spiral welded pipe comprising means for helically winding a sheet of metal into tubular form; a plug within the formed tube, a portion of said plug having a diameter sufficient to expand said tube by contact with its inner surface, thereby opening and maintaining a space between the adjacent edges of its convolutions; means for heating said edges while spaced by the expanding action of said plug; and means for forcing said heated edges together to form a welded seam.

2. An apparatus for making spiral welded pipe comprising means for helically winding a sheet of metal into tubular form; a plug within the formed tube, a portion of said plug having a diameter sufficient to expand said tube by contact with its inner surface, thereby opening and maintaining a space between the adjacent edges of its convolutions, and said plug having a depression in its surface in the region of its greatest diameter over which the spaced edges pass; means for heating said edges evenly throughout their entire thickness while passing over said depression; and means for subsequently forcing said heated edges together to form a welded seam.

3. An apparatus for making spiral welded pipe comprising means for helically winding a sheet of metal into tubular form; a fixed guide member lying between the adjacent convolutions of the wound sheet to maintain a space between the edges thereof; rollers carried by said guide member and bearing against the faces of said convolutions adjacent to their edges to maintain said edges in alignment; means for heating said spaced edges; and means for forcing said edges together to form a welded seam.

4. An apparatus for making spiral pipe comprising a fixed support; means for helically winding a sheet of metal into tubular form about said support; a guide member having a helical forward end mounted upon said support, said forward end being formed and positioned to bear against the rear edge of the first convolutions of the winding sheet to force it away from the adjacent forward edge of the incoming sheet, thereby opening and maintaining a space between said edges; means for heating the spaced edges; and means for subsequently forcing said heated edges together to form a welded seam.

5. An apparatus for making spiral welded pipe comprising means for helically winding a sheet of metal into tubular form with adjacent edges in abutting relation, means for creating a space between the adjacent edges of the wound sheet, means for heating said spaced edges, and oppositely disposed concave rollers bearing against the outer surface of the tubular wound sheet after it has passed said heating means, said rollers being formed to fit the contour of said tubularly wound sheet and spaced to contract it to force its heated edges together to form a welded seam.

6. An apparatus for making spiral welded pipe comprising means for winding a sheet of metal into tubular cylindrical form with adjacent edges in abutting relation, means for creating a space between the adjacent edges of the wound sheet to provide a helical open seam, means for heating said edges while spaced apart, the heating medium passing through the open seam to heat said edges evenly to welding temperature through the entire thickness of the sheet, and means for applying pressure to the wound tube subsequent to and remote from said heating means to force said heated edges together with sufficient pressure to cause them to weld, thereby forming a continuous welded helical seam.

7. An apparatus for making spiral welded pipe comprising means for helically winding a sheet of metal into tubular cylindrical form with adjacent edges in abutting relation, means for separating the adjacent edges of the wound sheet to provide a helical open seam, means for subsequently forcing said edges together under sufficient pressure to cause them to weld when heated to welding temperature, and heating means positioned at approximately the point of greatest separation of said edges, the heating medium passing through said open seam to heat said edges evenly to welding temperature throughout the entire thickness of the sheet, whereby a continuous welded joint is formed by the said edges when they are subsequently forced together.

HAROLD W. FORCE.